United States Patent
Noh et al.

(10) Patent No.: US 10,214,601 B2
(45) Date of Patent: Feb. 26, 2019

(54) NON-STRETCHED POLYPROPYLENE-BASED FILM

(71) Applicant: LG CHEM, LTD., Seoul (KR)

(72) Inventors: Kyung Seop Noh, Daejeon (KR); Ji Ho Choi, Daejeon (KR); Churl Young Park, Daejeon (KR); Ki Soo Lee, Daejeon (KR); Sang Jin Jeon, Daejeon (KR); Hee Kwang Park, Daejeon (KR); Won-Sang Lee, Daejeon (KR); Ah Young Seo, Daejeon (KR)

(73) Assignee: LG Chem, Ltd., Seoul (KR)

( * ) Notice: Subject to any disclaimer, the term of this patent is extended or adjusted under 35 U.S.C. 154(b) by 250 days.

(21) Appl. No.: 15/111,631

(22) PCT Filed: Dec. 4, 2015

(86) PCT No.: PCT/KR2015/013249
§ 371 (c)(1),
(2) Date: Jul. 14, 2016

(87) PCT Pub. No.: WO2016/089174
PCT Pub. Date: Jun. 9, 2016

(65) Prior Publication Data
US 2016/0333125 A1 Nov. 17, 2016

(30) Foreign Application Priority Data

Dec. 4, 2015 (KR) .......................... 10-2014-0173004

(51) Int. Cl.
| | |
|---|---|
| *C08F 110/00* | (2006.01) |
| *C08F 210/16* | (2006.01) |
| *C08J 5/18* | (2006.01) |
| *C09J 123/16* | (2006.01) |
| *C08L 23/14* | (2006.01) |
| *C08F 4/659* | (2006.01) |

(52) U.S. Cl.
CPC .............. *C08F 210/16* (2013.01); *C08J 5/18* (2013.01); *C09J 123/16* (2013.01); *C08F 4/65912* (2013.01); *C08F 4/65916* (2013.01); *C08F 2420/00* (2013.01); *C08F 2500/02* (2013.01); *C08F 2500/11* (2013.01); *C08F 2500/12* (2013.01); *C08J 2323/16* (2013.01); *C08L 23/14* (2013.01); *C09J 2205/114* (2013.01)

(58) Field of Classification Search
CPC ................ C08F 210/16; C08F 4/65912; C08F 4/65916; C08F 2420/00; C08F 2500/02; C08F 2500/11; C08F 2500/12; C08J 2323/16; C08J 5/18
See application file for complete search history.

(56) References Cited

U.S. PATENT DOCUMENTS

| | | | |
|---|---|---|---|
| 5,336,746 A | 8/1994 | Tsutsui et al. | |
| 5,583,253 A | 12/1996 | Henderson et al. | |
| 6,117,946 A | 9/2000 | Kume et al. | |
| 6,191,219 B1* | 2/2001 | Tanaka | C08J 5/18 525/232 |
| 6,436,494 B2 | 8/2002 | Tanaka et al. | |
| 6,503,993 B1* | 1/2003 | Huovinen | C08F 10/06 526/348.1 |
| 6,562,478 B1 | 5/2003 | Fischer et al. | |
| 7,351,478 B2* | 4/2008 | Hanyu | B32B 27/32 428/516 |
| 2004/0122196 A1* | 6/2004 | Pierini | C08F 110/06 526/351 |
| 2007/0116911 A1 | 5/2007 | Miller et al. | |
| 2013/0030137 A1* | 1/2013 | Cavalieri | C08F 210/06 526/348.5 |
| 2015/0073107 A1 | 3/2015 | Choi et al. | |
| 2016/0024641 A1* | 1/2016 | Monno | C08J 5/18 428/220 |
| 2016/0075865 A1* | 3/2016 | Hedesiu | C08L 23/14 428/36.9 |
| 2016/0145366 A1* | 5/2016 | Wang | C08F 210/06 526/66 |
| 2016/0376393 A1* | 12/2016 | Lhost | B32B 27/32 525/52 |
| 2017/0029609 A1* | 2/2017 | Grestenberger | C08K 3/34 |

FOREIGN PATENT DOCUMENTS

| | | |
|---|---|---|
| EP | 0263718 A2 | 4/1988 |
| EP | 0936247 A1 | 8/1999 |
| EP | 3034521 A1 | 6/2016 |
| JP | 9-85911 A | 3/1997 |
| JP | 10-119203 A | 5/1998 |
| JP | 2000-080218 A | 3/2000 |
| JP | 2000-129053 A | 5/2000 |
| JP | 2002-518229 A | 6/2002 |
| JP | 2002-284817 A | 10/2002 |
| JP | 2002-309012 A | 10/2002 |
| JP | 2004-506798 A | 3/2004 |
| JP | 2006-188562 A | 7/2006 |
| JP | 2006-249167 A | 9/2006 |
| JP | 2009-263407 A | 11/2009 |
| JP | 2010-501700 A | 1/2010 |
| JP | 2010-526182 A | 7/2010 |
| JP | 2014-185287 A | 10/2014 |
| KR | 10-1998-0077268 A | 11/1998 |
| KR | 10-1999-0014180 A | 2/1999 |
| KR | 10-0197950 B1 | 6/1999 |
| KR | 10-0289453 B1 | 5/2001 |
| KR | 10-0495176 B1 | 6/2005 |
| KR | 10-2008-0068639 A | 7/2008 |
| KR | 10-1133475 B1 | 4/2012 |
| KR | 10-2013-0049148 A | 5/2013 |

(Continued)

Primary Examiner — Michael L Leonard
(74) Attorney, Agent, or Firm — Dentons US LLP

(57) ABSTRACT

The polypropylene copolymer according to the present invention has a low melting point and also is excellent in the low temperature heat sealing effect, transparency and strength, and the film prepared therefrom can be effectively used as a sealing layer of the non-stretched polypropylene-based film.

11 Claims, No Drawings

(56) References Cited

FOREIGN PATENT DOCUMENTS

| | | |
|---|---|---|
| KR | 10-2013-0125311 A | 11/2013 |
| KR | 10-1423946 B1 | 8/2014 |
| KR | 10-2015-0037654 A | 4/2015 |
| KR | 10-2015-0052803 A | 5/2015 |
| WO | 2005/023889 A1 | 3/2005 |
| WO | 2013-168928 A1 | 11/2013 |

* cited by examiner

NON-STRETCHED POLYPROPYLENE-BASED FILM

CROSS-REFERENCE TO RELATED APPLICATION(S)

This application is a National Stage Entry of International Application No. PCT/KR2015/013249, filed Dec. 4, 2015, and claims the benefit of and priority to Korean Application No. 10-2014-0173004, filed Dec. 4, 2014, both of which are incorporated herein by reference in their entirety for all purposes as if fully set forth herein.

TECHNICAL FIELD

The present invention relates to a non-stretched polypropylene-based film, having a low xylene soluble content and capable of allowing sufficient heat sealing at a low temperature.

BACKGROUND OF ART

Olefin polymerization catalyst systems can be classified into Ziegler-Natta and metallocene catalyst systems, and these two highly active catalyst systems have been developed in compliance with their characteristics. Ziegler-Natta catalyst has been widely applied to existing commercial processes since it was developed in the 1950's. However, since the Ziegler-Natta catalyst is a multi-active site catalyst in which a plurality of active sites are mixed, it has a feature that the molecular weight distribution is broad. Also, since a compositional distribution of comonomers is not uniform, there is a problem that it has a limitation to secure the desired physical properties.

Meanwhile, the metallocence catalyst includes a main catalyst whose main component is a transition metal compound, and an organometallic compound cocatalyst whose main component is aluminum. Such a catalyst is a single-site catalyst which is a homogeneous complex catalyst, and offers a polymer having a narrow molecular weight distribution and an uniform composition distribution of comonomers, depending on the single site characteristics. The stereoregularity, copolymerizing properties, molecular weight, crystallinity and the like of the resulting polymer can be controlled by changing the ligand structure of the catalyst and the polymerization condition.

Among metallocene catalysts, an ansa-metallocene compound is an organic metal compound containing two ligands which are connected to each other by a bridge group, and the rotation of the ligand is prevented by the bridge group, and the activity and structure of the metal center are determined.

This ansa-metallocene compound is used as a catalyst in the preparation of an olefin-based homopolymer or copolymer. In particular, it is known that the ansa-metallocene compound containing cyclopentadienyl and fluorenyl can prepare a high molecular weight polyethylene, thereby controlling the microstructure of the polypropylene. Also, it is known that the ansa-metallocene compound containing indenyl ligand can prepare polyolefins having excellent activity and improved stereoregularity.

Meanwhile, CPP (casting polypropylene) film is a non-stretched film which is produced by T-Die process, and is widely used as a material for flexible packaging, such as food packaging. CPP film is generally composed of a skin layer, a core layer and a sealing layer. Here, the sealing layer is a portion where adhesion between the sealing layers is made by applying heat, and generally, polypropylene-based resin excellent in these properties is used.

However, the polypropylene-based resin prepared by Ziegler-Natta catalyst has high xylene soluble content and thus, a possibility of occurring defects in a process due to sticky properties is increased. Also, since the polypropylene-based resin prepared by metallocene catalysts has a relatively high melting point, there is a disadvantage that it is necessary to use high temperature for the adhesion between sealing layers.

Thus, the present inventors have conducted intensive studies about non-stretched polypropylene-based films having a low xylene soluble content and capable of allowing sufficient heat sealing at a low temperature, and found that a non-stretched polypropylene-based film comprising a terpolymer prepared by using a metallocene catalyst to be described below instead of a Ziegler-Natta catalyst and adjusting the comonomer, satisfies the above requirements, thereby completing the present invention.

DETAILED DESCRIPTION OF THE INVENTION

Technical Problem

In order to solve the above-mentioned problems, an object of the present invention is to provide a terpolymer that has a low melting point and also is excellent in the low-temperature heat sealing effect, transparency and strength, and a non-stretched polypropylene-based film comprising the same.

Technical Solution

In order to achieve the above object, the present invention provides a non-stretched polypropylene-based film comprising a propylene-ethylene-1-butene terpolymer which has a melting point (Tm) of 125 to 135° C., a molecular weight distribution (Mw/Mn, PDI) of 2.3 to 3.5, and a xylene soluble (Xs) content of 2.0% be weight or less, wherein when heat-sealed at 134° C. and 0.2 MPa for 1 second, a sealing strength is 300 to 500 g/15 mm.

The non-stretched film is prepared without stretching process, and this is usually called CPP(cast polypropylene) film. Since this is prepared by T-Die process, the thickness is uniform, the transparency and gloss are excellent, and the printability is also excellent. Therefore, it is widely used as a material for flexible packaging such as food packaging at a high market price. The CPP film is generally composed of a skin layer, a core layer and a sealing layer. As a double sealing layer among them, polypropylene is most commonly used.

The sealing layer is adhered between layers by applying heat, and this is called heat sealing. To increase the production rate during packaging, the time required for heat-sealing should be decreased. Therefore, it is necessary to use a polymer that can heat-seal at high temperature or allow sufficient heat sealing at a low temperature. Polypropylene is widely used as a sealing layer because the low-temperature heat sealing is possible, but the polypropylene-based resin prepared by Ziegler-Natta catalyst is sticky due to a high xylene soluble(Xs) content and thus, there is a problem that defects in a process are frequently generated.

Thus, according to the present invention, a propylene-ethylene-1-butene terpolymer which can lower a xylene soluble content and exhibit high sealing strength at low temperature is used.

The terpolymer according to the present invention is characterized by having a melting point (Tm) of 125 to 135° C. The melting point is associated with the temperature that is applied during the heat sealing. When the melting point is less than 125° C., there is a difficulty in the production process of terpolymers, and when it exceeds 135° C., the heat sealing characteristics are decreased.

Also, the terpolymer according to the present invention is characterized in that it has a crystallization temperature (Tc) of 75 to 87° C.

Also, the terpolymer according to the present invention is characterized by having a molecular weight distribution of (Mw/Mn, PDI) of 2.3 to 3.5. The molecular weight distribution is associated with the transparency and unique odor, and it can exhibit the optimum physical properties for use as packaging material in the range of the molecular weight distribution.

In addition, the terpolymer according to the present invention is characterized in that the xylene soluble(Xs) content is less than 2.0% by weight. The xylene soluble(Xs) content is a value representing an amount of atactic components in the entire terpolymer. The lower this content refers to the lower that sticky level of the terpolymer. Since the terpolymer according to the present invention has a low xylene soluble content, a possibility of occurring defects in the processing and heat sealing procedures is extremely low. Preferably, the xylene soluble(Xs) content is 1.5% by weight or less, and more preferably, the xylene soluble(Xs) content is 1.0% by weight or less.

The terpolymer according to the present invention is characterized by having excellent heat-sealing strength. The heat-sealing strength may be measured in accordance with ASTM F1921. Specifically, two films are sealed with a certain width (e.g., 15 mm) at a certain temperature, pressure and time, and then a force required for peeling out the two films is measured. At this time, the heat-sealing strength is measured by a value where the measured force is divided by the width of the film.

Further, the terpolymer according to the present invention is characterized by having $MFR_{2.16}$ (g/10 min, measured at 230° C. according to ASTM1238) of 5 to 7.

Further, the terpolymer according to the present invention can be prepared by copolymerizing propylene, ethylene and 1-butene.

Preferably, the weight ratio of the monomers (propylene: ethylene:1-butene) is 94-98:1-5:1, preferably 96-99:1-4:1.

The terpolymer according to the present invention can be prepared by copolymerizing propylene, ethylene and 1-butene in the presence of a catalyst comprising a metallocene compound represented by the following Chemical Formula 1.

[Chemical Formula 1]

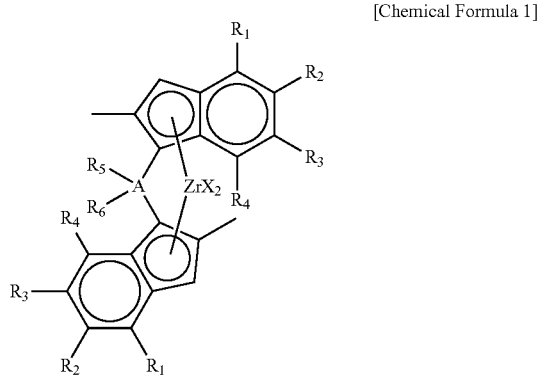

in Chemical Formula 1,
X is halogen which is the same as or different from each other,
$R_1$ is $C_{6-20}$ aryl substituted by $C_{1-20}$ alkyl,
$R_2$, $R_3$ and $R_4$ are each independently hydrogen, halogen, $C_1$-$C_{20}$ alkyl, $C_2$-$C_{20}$ alkenyl, $C_1$-$C_{20}$ alkylsilyl, $C_1$-$C_{20}$ silylalkyl, $C_1$-$C_{20}$ alkoxysilyl, $C_1$-$C_{20}$ ether, $C_1$-$C_{20}$ silylether, $C_1$-$C_{20}$ alkoxy, $C_6$-$C_{20}$ aryl, $C_7$-$C_{20}$ alkylaryl, or $C_7$-$C_{20}$ arylalkyl,
A is carbon, silicon, or germanium,
$R_5$ is $C_{1-20}$ alkyl substituted by $C_{1-20}$ alkoxy, and
$R_6$ is hydrogen, $C_1$-$C_{20}$ alkyl, or $C_2$-$C_{20}$ alkenyl.

Preferably, X is chloro.
Also preferably, $R_1$ is phenyl substituted by tert-butyl. More preferably, $R_1$ is 4-tert-butyl-phenyl.
More preferably, $R_2$, $R_3$ and $R_4$ are hydrogen.
Also preferably, A is silicon.
Also preferably, $R_5$ is 6-tert-butoxy-hexyl, and $R_6$ is methyl.

Representative examples of the compound represented by Chemical Formula 1 are as follows:

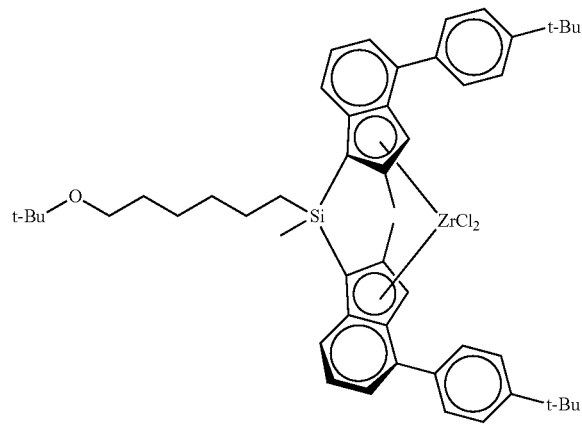

Further, the present invention provides a method for preparing a compound represented by Chemical Formula 1 as represented by the following Reaction Scheme 1:

[Reaction Scheme 1]

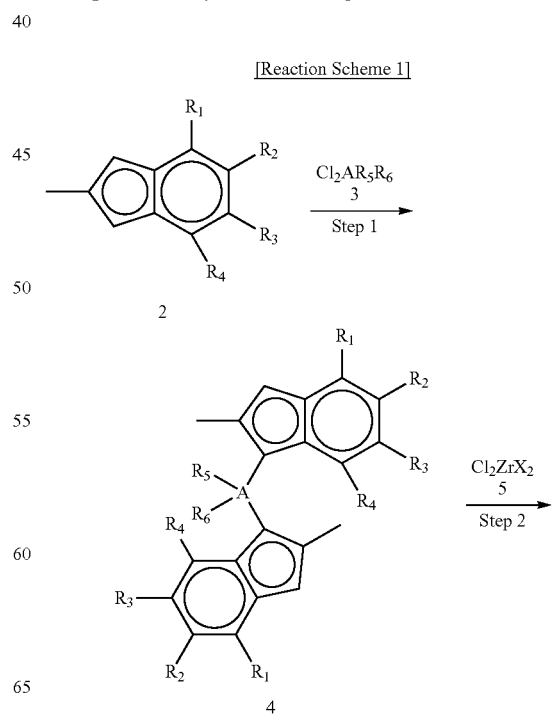

-continued

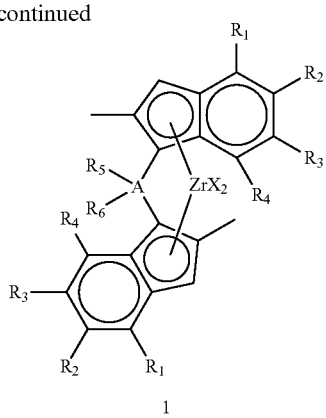

1

Step 1 is a step for preparing a compound represented by Chemical Formula 4 by reacting a compound represented by Chemical Formula 2 with a compound represented by Chemical Formula 3. In the above reaction, it is preferable to use alkyl lithium (for example, n-butyllithium), and the reaction temperature is −200 to 0° C. more preferably −150 to 0° C. As the solvent, toluene, THF and the like can be used. In this case, after separating the organic layer from the product, a step for drying the separated organic layer under vacuum and removing excess reagent can be further performed.

Step 2 is a step for preparing a compound represented by Chemical Formula 1 by reacting a compound represented by Chemical Formula 4 with a compound represented by Chemical Formula 5. In the above reaction, it is preferable to use alkyl lithium (for example, n-butyllithium), and the reaction temperature is −200 to 0° C. and more preferably −150 to 0° C. As the solvent, ether, hexane and the like can be used.

The compound represented by Chemical Formula 1 can, in itself or together with a cocatalyst as a catalyst precursor, be used as a catalyst for polymerization of the terpolymer according to the present invention.

The catalyst for polymerization of the terpolymer may be a catalyst supported on a support. The support can be used without particular limitation as long as it is conventional in the art, but preferably, one or more supports selected from the group consisting of silica, silica-alumina and silica-magnesia can be used. On the other hand, when supporting the catalyst on a support such as silica, the supporting is made by a chemical bonding of the silica support and the functional group of the compound represented by Chemical Formula 1. Thereby, there is almost no catalyst which is liberated from the surface in the polymerization step of the terpolymer. Therefore, when preparing the terpolymer by slurry or gas phase polymerization process, fouling which aggregates or adheres on a reactor wall or between polymer particles is not generated.

Further, the terpolymer that is prepared in the presence of a catalyst comprising such silica support has excellent particle shape and apparent density of the polymer and thus it can be suitably used for the conventional slurry or gas phase polymerization process. Therefore, preferably it is possible to use the support that is dried at high temperature to have a siloxane group which is greatly reactive on the surface.

Specifically, the silica, silica-alumina and the like dried at a high temperature can be used, and they may usually contain oxide, carbonate, sulfate, nitrate components such as $Na_2O$, $K_2CO_3$, $BaSO_4$, or $Mg(NO_3)_2$.

Further, the catalyst for the polymerization of the terpolymer may further comprise a cocatalyst consisting of alkyl-aluminoxane. In the case of using such a cocatalyst, it can be used in the form of a catalyst in which X bonded to a metal element of the compound represented by Chemical Formula 1 is substituted by alkyl group, for example, $C_{1-20}$ alkyl.

The cocatalyst can be used without particular limitation as long as it can be commonly used in the technical field to which the present invention pertains. However, preferably one or more cocatalysts selected from the group consisting of silica, silica-alumina, and an organic aluminum compound can be used.

Here, the polymerization of the terpolymer may be carried out by reacting at a temperature of 25 to 500° C. and a pressure of 1 to 100 kgf/cm² for 1 to 24 hours. At this time, the polymerization temperature is preferably 25 to 200°C. and more preferably 50 to 100° C. Further, the polymerization pressure is preferably 1 to 70 kgf/cm² and more preferably 5 to 40 kgf/cm². The polymerization time is preferably 1 to 5 hours.

The polymerization process can adjust the molecular weight range of the polymer product finally produced, depending on the conditions of the addition or non-addition of hydrogen. In particular, the high molecular weight terpolymer can be prepared under the conditions of not adding hydrogen. If hydrogen is added, the low molecular weight terpolymer can be prepared even with low hydrogen content. At this time, the amount of hydrogen to be added to the polymerization process can be in the range of 0.07 L to 4 L under reactor condition of 1 bar, or hydrogen can be supplied at a pressure of 1 bar to 40 bar or it can be supplied at 168 ppm to 8,000 ppm in the range of hydrogen molar content compared to monomer.

In addition, the present invention provides a non-stretched polypropylene-based film which is prepared by the terpolymer and which has a sealing strength of 300 to 500 g/15 mm when heat-sealed at 134° C. and 0.2 MPa for 1 second. The above-described film can be used as a sealing layer of the non-stretched film and it can be prepared by T-Die process.

The non-stretched polypropylene-based film may further comprise a polypropylene-based core layer and a skin layer which are formed sequentially on the sealing layer.

The adhesion between the sealing layers can be made by applying heat to the sealing layer of the non-stretched polypropylene-based film. As described above, the terpolymer according to the present invention allows sufficient heat sealing at a low temperature, increases the production rate upon packaging, allows the use of less energy, thereby increasing the process efficiency. In addition, due to the low xylene soluble content, it is possible to prevent the process defects caused by the sticky properties of the sealing layer.

Preferably, the sealing layer of the non-stretched polypropylene-based film may further comprise a propylene-based elastomer, for example, an elastomer in the form of propylene-ethylene copolymer. As such propylene-based elastomer, all propylene-based elastomers, prepared by methods previously known, or prepared by existing Ziegler-Natta catalyst or metallocene catalyst which are commercially available, can be used without particular limitation. As the propylene-based elastomer is added, the sealing strength of the film can be more increased. The propylene-based elastomer is included preferably in an amount of 3-7% by weight relative to the weight of the film.

Advantageous Effects

The polypropylene copolymer according to the present invention has a low melting point and also is excellent in the low temperature heat sealing effect, transparency and strength, and the film prepared therefrom can be effectively used as a sealing layer of the non-stretched film.

DETAILED DESCRIPTION OF THE EMBODIMENTS

Hereinafter, preferred examples are provided for better understanding of the invention. However, these examples are for illustrative purposes only and the invention are not intended to be limited by these examples.

PREPARATION EXAMPLE 1

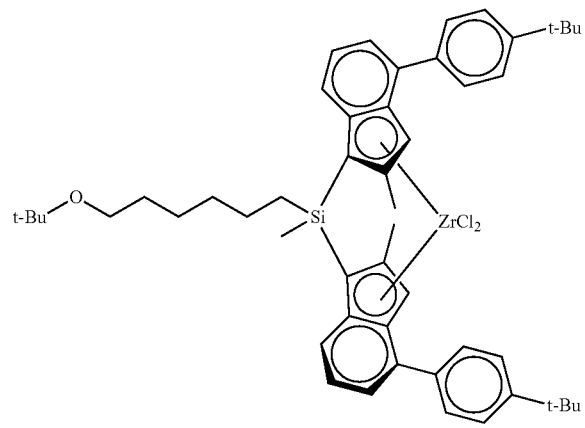

Step 1) Preparation of (6-t-butoxyhexyl)(methyl-bis (2-methyl-4-tert-butyl-phenylindenyl)silane 2-methyl-4-tert-butylphenylindene (20.0 g, 76 mmol) was dissolved in toluene/THF=10/1 solution (230 mL) to which n-butyllithium solution (2.5 M, hexane solvent, 22 g) was slowly added dropwise at 0° C., and then stirred at room temperature for a day. Thereafter, (6-t-butoxyhexyl)dichloromethane silane/1.27g) was slowly added dropwise to the mixed solution at −78° C. stirred for about 10 minutes and then stirred at room temperature for a day.

Thereafter, the organic layer was separated by adding water, and the solvent was distilled under reduced pressure to obtain (6-t-butoxyhexyl)(methyl)-bis(2-methyl-4-tert-butyl-phenylindenyl)silane.

$^1$H NMR (500 MHz, CDCl$_3$, 7.26 ppm): −0.20-0.03 (3H, m), 1.26 (9H, s), 0.50-1.20 (4H, m), 1.20-1.31 (11H, m), 1.40-1.62 (20H, m), 2.19-2.23 (6H, m), 3.30-3.34 (2H, m), 3.73-3.83 (2H, m), 6.89-6.91 (2H, m), 7.19-7.61 (14H, m)

Step 2) Preparation of [(6-t-butoxyhexylmethylsilane-diyl)-bis(2-methyl-4-tert-butylphenylindenyl)] zirconium dichloride (6-t-butoxyhexyl)(methyl)-bis(2-methyl-4-tert-butyl-phenylindenyl)silane prepared in the step 1 was dissolved in toluene/THF 5/1 solution (95 mL) to which n-butyl lithium solution (2.5 M, hexane solvent, 22 g) was slowly added dropwise at −78° C. and then stirred at room temperature for a day. To the reaction solution, bis(N,N'-diphenyl-1,3-propanediamido)dichlorozirconium bis(tetrahydrofuran) [Zr(C$_5$H$_6$NCH$_2$CH$_2$NC$_5$H$_6$)Cl$_2$(C$_4$H$_8$O)$_2$] was dissolved in toluene (229 mL) and then slowly added dropwise at −78° C., followed by stirring at room temperature for a day. After cooling the reaction solution at −78° C., HCl ether solution (1 M, 183 mL) was slowly added dropwise and then stirred at 0° C. for 1 hour. Thereafter, the mixture was filtered and dried under vacuum to which hexane was added and then stirred to precipitate a crystal. The precipitated crystal was filtered and dried under vacuum to obtain [(6-t-butoxyhexylmethylsilane-diyl)-bis(2-methyl-4-tert-butylphenylindenyl)]zirconium dichloride (20.5 g, of 61%).

$^1$H NMR (500 MHz, CDCl$_3$, 7.26 ppm): 1.20 (9H, s), 1.27 (3H, s), 1.34 (18H, s), 1.20-1.90 (10H, m), 2.25 (3H, s), 2.26 (3H, s), 3.38 (2H, t), 7.00 (2H, s), 7.09-7.13 (2H, m), 7.38 (2H, d), 7.45 (4H, d), 7.58 (4H, d), 7.59 (2H, d), 7.65 (2H, d)

Step 3) Preparation of a Supported Catalyst 3 g of silica was pre-weighed into a shrink flask to which 52 mmol of methylaluminoxane (MAO) was added and then reacted at 90° C. for 24 hours. After precipitation, the upper layer was removed and washed two times with toluene. 180 μmol of ansa-metallocene compound [(6-t-butoxyhexylmethylsilane-diyl)-bis(2-methyl-4-tert-butylphenylindenyl)] zirconium dichloride synthesized above was dissolved in toluene and then reacted at 70° C. for 5 hours. After completion of the reaction, the upper layer solution was removed and the residual reaction product was washed with toluene and again washed with hexane and then dried under vacuum to obtain 5 g of silica-supported metallocene catalyst in the form of a solid particle.

EXAMPLE 1

Step 1

The polypropylene polymer was prepared by using the metallocene supported catalyst prepared in Preparation Example 1, by the following method.

First, a 2 L stainless steel reactor was dried under vacuum at 65° C. and then cooled, to which 1.5 mmol of triethylaluminum was added at room temperature, 0.37 L of hydrogen was added, and 1.5 L of propylene were added, sequentially. Then, after stirring for 10 minutes, the metallocene supported catalyst prepared in Preparation Example 1 was added to the reactor under nitrogen pressure. Then, the reactor temperature was raised up to 70° C. within 5 minutes, followed by polymerization for 1 hour. After completion of the reaction, unreacted propylene was vented.

Step 2

In order to minimize the deformation and damage of the resin at a high temperature, 500-1000 ppm of calcium stearate (neutralizing agent), 500-1000 ppm of Irganox 1010 (primary antioxidant), 1000-1500 ppm of Irganox 168 (secondary antioxidant), 1000-1500 ppm of Erucamide (slip agent) and SiO$_2$ (anti-blocking agent) as additives were added based on the amount of the polypropylene polymer powder sample prepared in the step 1, and strands were drawn at 5-15 kg/h at 180-220° C. Then, the prepared strands were pelletized by a pelletizer at 500-900 rpm to prepare a pellet.

EXAMPLE 2

C3 elastomer (VM3020FL) was mixed to the polymer prepared in the step 1 of Example 1, and the pellet was prepared by the following method.

Specifically, in order to minimize the deformation and damage of the resin at a high temperature, 500-1000 ppm of calcium stearate (neutralizing agent), 500-1000 ppm of Irganox 1010 (primary antioxidant), 1000-1500 ppm of Irganox 168 (secondary antioxidant), 1000-1500 ppm of Erucamide(slip agent) and 1000-1500 ppm of $SiO_2$(anti-blocking agent) as additives were added based on the amount of the polypropylene polymer powder sample prepared in the step 1 of Example 1, and then mixed with 5 wt % of C3 elastomer (VM3020FL) having the characteristics of low-temperature crystallization region in order to improve the heat-sealability of the resin. Strands were drawn at 5-15 kg/h at 180-220° C. Then, the prepared strands were pelletized by a pelletizer at 500-900 rpm to prepare a pellet

COMPARATIVE EXAMPLE 1

WINTECT™ product (available from JPP Corporation) was used as Comparative Example 1.

COMPARATIVE EXAMPLE 2

T3450L (available from LG Chem Ltd.) was used as Comparative Example 2.

EXPERIMENTAL EXAMPLE

The physical properties of the respective copolymers prepared in Examples and Comparative Examples were measured by the following method.

(1) Melting point (Tm) of the polymer: The melting point of the polymer was measured using Differential Scanning Calorimeter (DSC, device name: DSC 2920, manufacturer: TA instrument). Specifically, the polymer was heated up to 220° C. and then maintained at the same temperature for 5 minutes. After cooling to 20° C., the temperature was again increased. At this time, the increasing speed and the lowering speed of the temperature was adjusted to 10° C./min, respectively.

(2) Crystallization temperature (Tc) of the polymer: the crystallization temperature was set from a DSC curve that appears while reducing the temperature under the same conditions as the melting point.

(3) Melt Index (MI): measured at 230° C. under a load of 2.16 kg in accordance with ASTM D1238, and expressed as weight (g) of the polymer obtained by melting for 10 minutes.

(4) Sealing strength: measured in accordance with ASTM F1921. Specifically, after preparing two films with a width of 15 mm, the films were sealed at 128-140° C. and 0.2 MPa for 1 second, and then the force required for peeling out the two films were measured. At this time, the sealing strength was measured by a value where the measured force was divided by the width of the polymer.

(5) Tensile strength and elongation: the film test sample that measured the thickness was fixed to UTM equipment (ZWICK Roell Inc.), to fill the cross-sectional area. MD and TD directions of the test sample were measured at a speed of 200 mm/min, respectively. The tensile strength ($kg/cm^2$) was confirmed by dividing the elongation (%), the yield load (Kgf) and load at break(kg) of the respective samples by the cross-sectional area ($cm^2$)

(6) Xylene soluble: Xylene was added to the sample, heated at 135° C. for 1 hour, and then cooled for 30 minutes, followed by pre-treatment. Xylene was flowed at a rate of 1 mL/min for 4 hours with OminiSec (Viscotek Corporation, FIPA) equipment. When the base line of RI, DP and IP was stabilized, the concentration and the injection amount of the pre-treated samples were filled and measured, thereby calculating the peak area.

The results are shown in Tables 1 and 2 below.

TABLE 1

| | Tm (° C.) | Tc (° C.) | MI (g/10 min) | Xylene soluble (wt %) | Sealing strength (g/15 mm) | | | | |
|---|---|---|---|---|---|---|---|---|---|
| | | | | | 128° C. | 131° C. | 134° C. | 137° C. | 140° C. |
| Comparative Example 1 | 123.9 | 87.7 | 6.6 | 1.1 | 49 | 74 | 99 | 242 | x[1)] |
| Comparative Example 2 | 128.3 | 82.1 | 7.6 | 10.2 | 102 | 256 | 496 | x | x |
| Example 1 | 125.4 | 84.6 | 5.8 | 0.9 | 59 | 122 | 321 | x | x |
| Example 2 | 125.1 | 85.3 | 6.2 | 1.0 | 85 | 170 | 420 | x | x |

[1)]Not peeled when measured up to 500 g/15 mm

TABLE 2

| | MD | | | TD | | |
|---|---|---|---|---|---|---|
| | Tensile Strength @ Yield ($kg/cm^2$) | Tensile Strength @ Break ($kg/cm^2$) | Elongation (%) | Tensile Strength @Yield ($kg/cm^2$) | Tensile Strength @ Break ($kg/cm^2$) | Elongation (%) |
| Comparative Example 1 | 203 | 370 | 487 | 157 | 370 | >700 |
| Comparative Example 2 | 197 | 543 | 494 | 164 | 394 | >700 |
| Example 1 | 203 | 444 | 481 | 156 | 429 | >700 |
| Example 2 | 188 | 281 | 372 | 154 | 385 | >700 |

The invention claimed is:

1. A non-stretched polypropylene-based film comprising a propylene-ethylene-1-butene terpolymer which has a melting point (Tm) of 125 to 135° C., a molecular weight distribution (Mw/Mn, PDI) of 2.3 to 3.5, and a xylene soluble (Xs) content of 2.0 wt° or less,
wherein the terpolymer has a crystallization temperature (Tc) of 75 to 87° C.,
wherein the terpolymer has $MFR_{2,16}$(g/10 min, measured at 230° C. according to ASTM1238) of 5 to 7, and wherein, when heat-sealed at 134° C. and 0.2 MPa for 1 second, a sealing strength of the terpolymer is 300 to 500 g/15mm.

2. The non-stretched polypropylene-based film according to claim 1, which comprises a sealing layer comprising the terpolytner.

3. The non-stretched polypropylene-based film according to claim 2, which further comprises a polypropylene-based core layer and a skin layer which are sequentially formed on the sealing layer.

4. The non-stretched polypropylene-based film according to claim 1, wherein the terpolytner is prepared by copolymerizing propylene, ethylene and 1-butene in the presence of a catalyst comprising a metallocene compound represented by the following Chemical Formula 1:

[Chemical Formula 1]

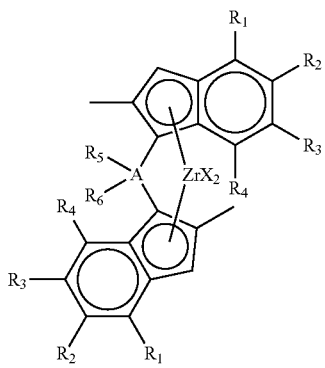

in Chemical Formula 1,
X is halogen which is the same as or different from each other,
$R_1$ is $C_{6-20}$ aryl substituted by $C_{1-20}$ alkyl,
$R_2$, $R_3$ and $R_4$ are each independently hydrogen, halogen, $C_1$-$C_{20}$ alkyl, $C_2$-$C_{20}$ alkenyl, $C_1$-$C_{20}$ alkylsilyl, $C_1$-$C_{20}$ silylalkyl, $C_1$-$C_{20}$ alkoxysilyl, $C_1$-$C_{20}$ ether, $C_1$-$C_{20}$ silylehter, $C_1$-$C_{20}$ alkoxy, $C_6$-$C_{20}$ aryl, $C_7$-$C_{20}$ alkylaryl, or $C_7$-$C_{20}$ arylalkyl, A is carbon, silicon, or germanium
$R_5$ is $C_{1-20}$ alkyl substituted by $C_{1-20}$ alkoxy, and
$R_6$ is hydrogen, $C_1$-$C_{20}$ alkyl, or $C_2$-$C_{20}$ alkenyl.

5. The non-stretched polypropylene-based film according to claim 4, wherein X is chloro.

6. The non-stretched polypropylene-based film according to claim 4, wherein $R_1$ is phenyl substituted by tert-butyl.

7. The non-stretched polypropylene-based film according to claim 4, wherein $R_2$, $R_3$ and $R_4$ are hydrogen.

8. The non-stretched polypropylene-based film according to claim 4 wherein A is silicon.

9. The non-stretched polypropylene-based film according to claim 4, wherein $R_5$ is 6-tert-butoxy-hexyl, and $R_6$ is methyl.

10. The non-stretched polypropylene-based film according to claim 4, wherein the compound is a compound represented by the following Chemical Formula:

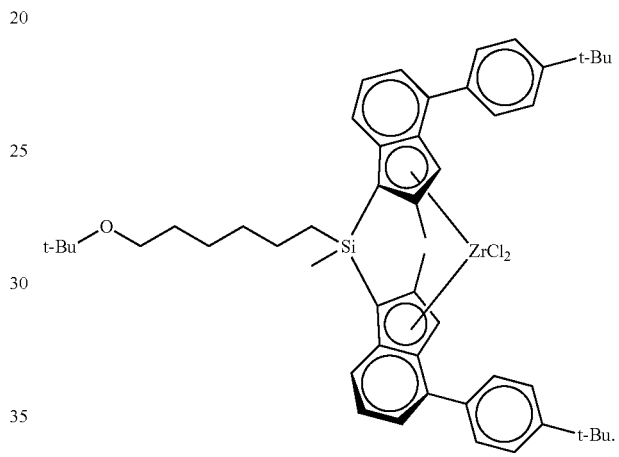

11. The non-stretched polypropylene-based film according to claim 2 wherein the sealing layer further comprises a propylene-based elastomer.

* * * * *

UNITED STATES PATENT AND TRADEMARK OFFICE
CERTIFICATE OF CORRECTION

PATENT NO. : 10,214,601 B2  
APPLICATION NO. : 15/111631  
DATED : February 26, 2019  
INVENTOR(S) : Noh et al.

Page 1 of 1

It is certified that error appears in the above-identified patent and that said Letters Patent is hereby corrected as shown below:

On the Title Page

Foreign Application Priority Data should read:  
(30) Dec. 4, 2014 (KR)........................10-2014-0173004

Signed and Sealed this  
Twenty-third Day of April, 2019

Andrei Iancu  
*Director of the United States Patent and Trademark Office*